Sept. 30, 1969    H. L. SUNDERMANN    3,469,659
REMOTE CONTROLLED ACTUATING AND RELEASE TOGGLE
Filed Aug. 21, 1967

INVENTOR.
Henry L. Sundermann
BY
ATTORNEY

United States Patent Office 3,469,659
Patented Sept. 30, 1969

3,469,659
REMOTE CONTROLLED ACTUATING
AND RELEASE TOGGLE
Henry L. Sundermann, Rte. 4, Box 79,
Sioux Falls, S. Dak. 57107
Filed Aug. 21, 1967, Ser. No. 662,165
Int. Cl. F16d 51/00; G05g 1/04
U.S. Cl. 188—74                   2 Claims

ABSTRACT OF THE DISCLOSURE

A toggle device particularly useful in controlling brakes for an overhead trolley device. The mechanism provides by means of a linkage and cam arrangement for a pull control both to set and release the brakes.

My invention relates to an actuating device which can set or release a brake for instance or other similar device and at remote distances.

A further object of my invention is to provide such a device in an arrangement which can be readily attached to the structure of the brake or other device, etc.

Figure 1:
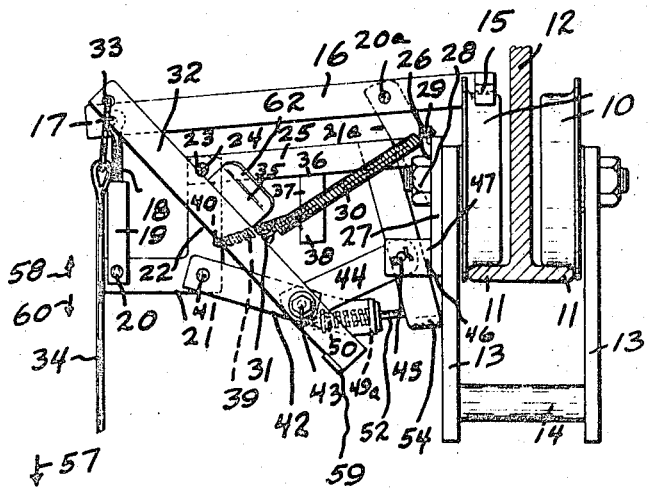
Figure 3:
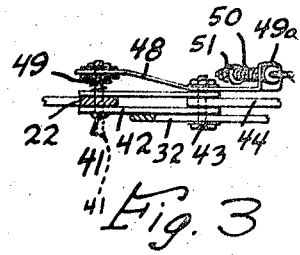
Figure 2:
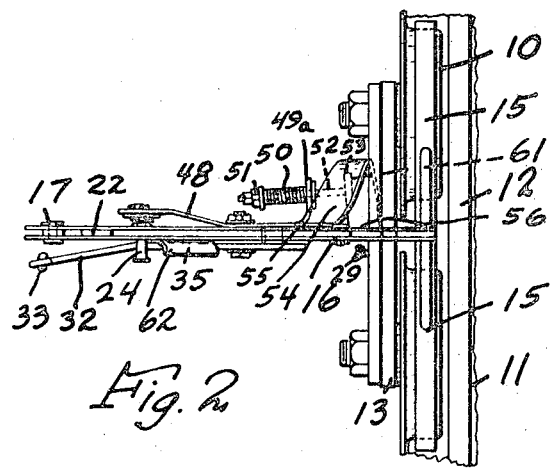
Figure 4:
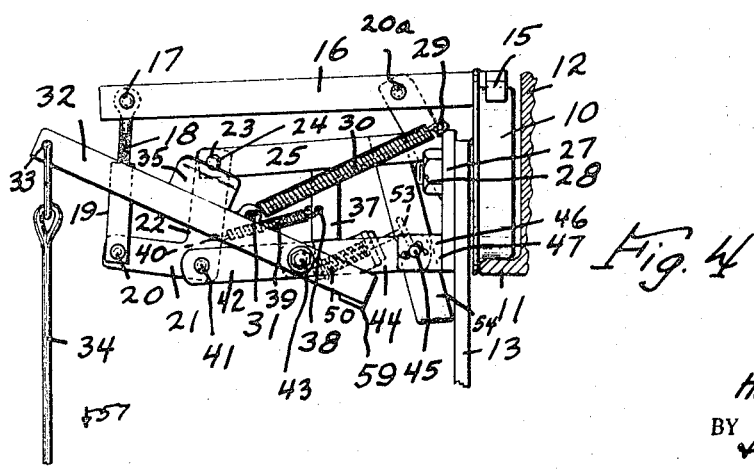

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a side elevation of the device,
FIGURE 2 is a plan view of FIGURE 1,
FIGURE 3 is a detail, and
FIGURE 4 is a further side elevation showing the device in its braking position.

My invention contemplates the provision of a device by which a brake or other similar arrangement can be released or actuated by means of a lengthened cable or the like.

In referring to FIGURE 1, wherein the device is shown with the brake being in its unlocked position, the character 10 will designate a pair of wheels adapted to roll along the tracks 11, which are a part of the member 12, the character 13 indicating brackets attached by means of the bar 14. The character 15 indicates brake shoes which are attached to the end of the lever 16 which is pivotally secured at 17 to the threaded member 18 which is used for adjustment and which threaded member threadably engages the member 19 which is pivotally attached at 20 to the arm 21 which extends into the integral arm portion 22. The lever 16 is also pivotally attached at 20a to a bar 21a. The portion 22 is pivotally attached at 23 to a lengthened pin 24 and also pivoted to the pin 24 is the link or bar 25 which is secured at 26 to the plate 27 which is secured as at 28 to one of the members 13.

Attached at 29 to the plate 27 is the coiled spring 30 (only partially shown in FIGURE 2) which is attached at 31 to a further link 32 which bears against the pin 24 and attached at 33 to the link 32 is the downwardly extending cable 34.

Attached to the link 32 is the curved plate 35, and attached to the bar 25 at 36 is the further bar 37 to which is attached at 38 a further coiled spring 39 which is attached at 40 to the member 22.

Pivotally attached at 41 to the member 22 is a still further link 42 which is pivotally attached at 43 to the link 32, and which is pivotally attached at the same point to the further link 44 which is pivotally attached at 45 to the ear 46 which is secured as at 47 to the member 13.

A further bar 48 (see FIGURE 2) is also attached to the point 41 which is provided by an extended pin 49, and the bar 48 extends into the portion 49a which bears against the spring 50 which in turn bears against the washer and nut assembly 51. The spring 50 receives the rod 52 which terminates in the circular member 53 which is adapted to bear against the curved bar 54 which is attached at 55 and at 56.

The device operates in the following manner. FIGURE 1 shows the brake member in the off position or the unlocked position. To lock the brakes against the wheels 10, the operator, who can be located at a remote distance below will pull on the cable 34 in the direction of the arrow 57. This will cause the lever 32 to contact the pin 41, the pin then being in the dotted line position of FIGURE 3, which will cause the links 42 and 44 to be in straight alignment which will swing the end of the member 21 in the direction of the arrow 58 to thereby pivot the member 16 and apply the brakes. This action also raises the rounded member 53 against the surface 61 which carries the pin 51 to the solid line position shown in FIGURE 3. The lever 32 is then allowed to raise or contact the pin 23 as disclosed in FIGURE 4.

To release the brakes, the lever 32 is pulled downwardly again in the direction of the arrow 57 being allowed to pass the pin 41 since the pin will not be in its dotted line position. The stop 59 which is attached to the lever 32 then breaks the straight alignment of the links 42 and 44 which causes the end of the member 21 to swing downwardly in the direction of the arrow 60 again releasing the brakes. The lower end of the member 37 permits the links 42 and 44 to be held in straight line position. The rounded portion 62 of the member 35 permits the lever 32 to pass the pin 41 during any position of the said pin.

In this manner, the operator can apply the brakes or release the same as desired from a remote distance, it being understood also that this arrangement can be used for other devices as well.

I claim as my invention:

1. A remote controlled toggle comprising a lever, a support to which said lever is pivoted, operating means attached to said lever and actuated thereby, means for pivoting said lever including a link, a further link pivoted to said link, a still further link pivoted to said further link, means for providing straight alignment of all of said links to pivot said lever to operate said operating means, the pivot point of said link and said further link comprising a laterally movable pin, a control lever pivotally mounted at the pivot point of said further link and said still further link whereby abutment of said control lever with said laterally movable pin will cause said straight alignment of said links.

2. The structure of claim 1 and means for moving said laterally movable pin including a framework including a cam surface, a bar attached to said laterally movable pin, an abutment member attached to said bar and bearing against said cam surface, means for breaking the straight line positioning of said links for releasing said brake device.

References Cited

UNITED STATES PATENTS 2,738,034   3/1956   Levine _____ 188—74 X
3,181,408   5/1965   Richards _____ 74—520 X DUANE A. REGER, Primary Examiner U.S. Cl. X.R.

74—520